US009177136B2

(12) United States Patent
Ishiyama

(10) Patent No.: US 9,177,136 B2
(45) Date of Patent: Nov. 3, 2015

(54) INFORMATION DEVICE, PROGRAM, METHOD, AND COMPUTER READABLE RECORDING MEDIUM FOR PREVENTING EXECUTION OF MALICIOUS PROGRAM CODE

(75) Inventor: Toshiaki Ishiyama, Tokyo (JP)

(73) Assignee: FFRI, INC., Tokyo (JP)

( * ) Notice: Subject to any disclaimer, the term of this patent is extended or adjusted under 35 U.S.C. 154(b) by 0 days.

(21) Appl. No.: 13/266,667

(22) PCT Filed: Apr. 12, 2010

(86) PCT No.: PCT/JP2010/056500
§ 371 (c)(1),
(2), (4) Date: Oct. 27, 2011

(87) PCT Pub. No.: WO2010/125902
PCT Pub. Date: Nov. 4, 2010

(65) Prior Publication Data
US 2012/0047579 A1    Feb. 23, 2012

(30) Foreign Application Priority Data

Apr. 27, 2009    (JP) ................................ 2009-107294

(51) Int. Cl.
*G06F 7/04*     (2006.01)
*G06F 21/52*    (2013.01)
(Continued)

(52) U.S. Cl.
CPC ............... *G06F 21/52* (2013.01); *G06F 21/54* (2013.01); *G06F 21/554* (2013.01)

(58) Field of Classification Search
CPC ...................................................... G06F 21/52
USPC ............................................................ 726/23
See application file for complete search history.

(56) References Cited

U.S. PATENT DOCUMENTS 7,287,283 B1 * 10/2007 Szor .............................. 726/26
7,945,953 B1 *  5/2011 Salinas et al. ................. 726/22
(Continued)

FOREIGN PATENT DOCUMENTS

CN        1516020 A     7/2004
EP      1 811 381 A2    7/2007
(Continued)

OTHER PUBLICATIONS

The Geometry of Innocent Flesh on the Bone: Return-into-libc without Function Calls (on the x86) Hovav Shacham hovav@cs.ucsd.edu/ ACM 2007.*
(Continued)

*Primary Examiner* — Matthew Henning
*Assistant Examiner* — Gary Gracia
(74) *Attorney, Agent, or Firm* — Holtz, Holtz, Goodman & Chick PC

(57) ABSTRACT

An information device performs data processing by executing program codes loaded in a memory with a central control unit. The information device includes a detection unit which detects a timing when any one of the program codes is called, a return address acquisition unit which sequentially acquires return addresses of the program codes loaded in the memory at the timing detected by the detection unit, and a termination unit which searches for an illegal access based on destination addresses that are respectively pointed by the return addresses sequentially acquired by the return address acquisition unit at the timing detected by the detection unit and which terminates the data processing when the illegal access is detected.

4 Claims, 10 Drawing Sheets

(51) Int. Cl.
*G06F 21/54* (2013.01)
*G06F 21/55* (2013.01)
*G06F 17/30* (2006.01)

(56) References Cited

U.S. PATENT DOCUMENTS

| | | |
|---|---|---|
| 2004/0133773 A1 | 7/2004 | Yanagi |
| 2004/0133777 A1 | 7/2004 | Kiriansky et al. |
| 2005/0166001 A1* | 7/2005 | Conover et al. ............... 711/100 |
| 2005/0283838 A1* | 12/2005 | Saito ................................ 726/24 |
| 2007/0204257 A1 | 8/2007 | Kinno et al. |
| 2007/0255893 A1* | 11/2007 | Takeuchi ....................... 711/103 |
| 2007/0266214 A1* | 11/2007 | Ohyama ........................ 711/163 |
| 2008/0016314 A1* | 1/2008 | Li et al. ......................... 711/200 |
| 2008/0209265 A1* | 8/2008 | Fuchikami ......................... 714/8 |
| 2008/0244229 A1* | 10/2008 | Yao et al. ....................... 712/205 |
| 2008/0301408 A1* | 12/2008 | Kranich ........................... 712/31 |
| 2008/0320247 A1* | 12/2008 | Morfey et al. ................. 711/154 |
| 2009/0038008 A1* | 2/2009 | Pike ................................ 726/22 |
| 2009/0144827 A1* | 6/2009 | Peinado et al. ................. 726/25 |
| 2009/0187396 A1* | 7/2009 | Kinno et al. .................... 703/22 |
| 2009/0204785 A1* | 8/2009 | Yates et al. .................... 711/205 |
| 2009/0320136 A1* | 12/2009 | Lambert et al. ................ 726/25 |
| 2010/0011209 A1* | 1/2010 | Kiriansky et al. ............. 713/166 |
| 2010/0153785 A1* | 6/2010 | Keromytis et al. ............. 714/38 |
| 2011/0154487 A1 | 6/2011 | Nakayama et al. |
| 2012/0066698 A1* | 3/2012 | Yanoo .......................... 719/330 |

FOREIGN PATENT DOCUMENTS

| | | |
|---|---|---|
| EP | 2 026 237 A1 | 2/2009 |
| JP | 2004-126854 A | 4/2004 |
| WO | WO 2008/117872 A1 | 10/2008 |

OTHER PUBLICATIONS

International Search Report dated May 18, 2010 issued in International App. No. PCT/JP2010/056500.
(URL: http://en.wikipedia.org/wiki/Return-to-libc_attack): Return-To-LIBC Attack; (on line) presented by Wikimedia Foundation retrieved on the internet on Mar. 23, 2009.
Japanese Office Action dated Apr. 27, 2010 (and English translation thereof) in counterpart Japanese Application No. 2009-107294.
Extended European Search Report (EESR) dated Jul. 9, 2013 (in English) issued in counterpart European Application No. 10769601.5.
Chinese Office Action dated May 12, 2014, in counterpart Chinese Application No. 201080018527.7.
Chinese Office Action dated Oct. 29, 2013 (and English translation thereof) in counterpart Chinese Application No. 201080018527.7.
Chinese Office Action dated Aug. 6, 2014, issued in counterpart Chinese Application No. 201080018527.7.

* cited by examiner

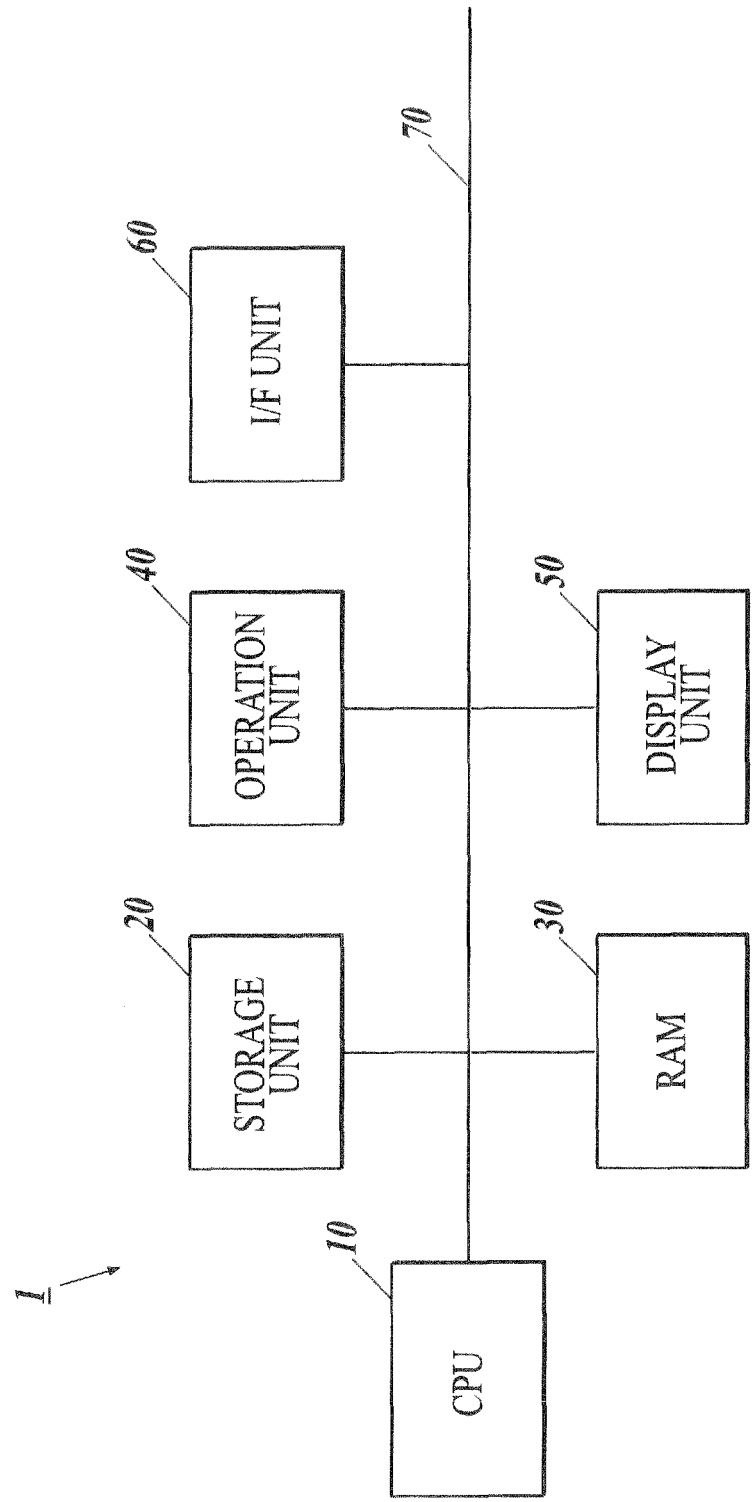

FIG.2A

| |
|---|
| ARGUMENT OF ExitProcess |
| Return Address |
| ARGUMENT 2 OF WinExec |
| ARGUMENT 1 OF WinExec |
| STARTING ADDRESS OF ExitProcess |
| ebp backup |
| |

FIG.2B

| |
|---|
| ARGUMENT OF ExitProcess |
| Return Address |
| ARGUMENT 2 OF WinExec |
| ARGUMENT 1 OF WinExec |
| EXISTING PROGRAM CODE |
| ebp backup |
| |

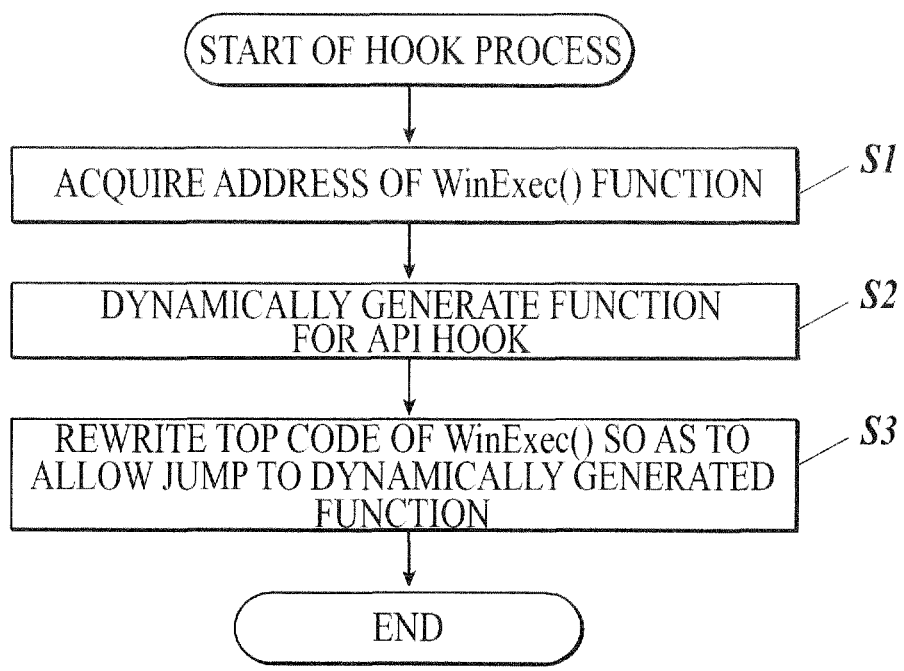

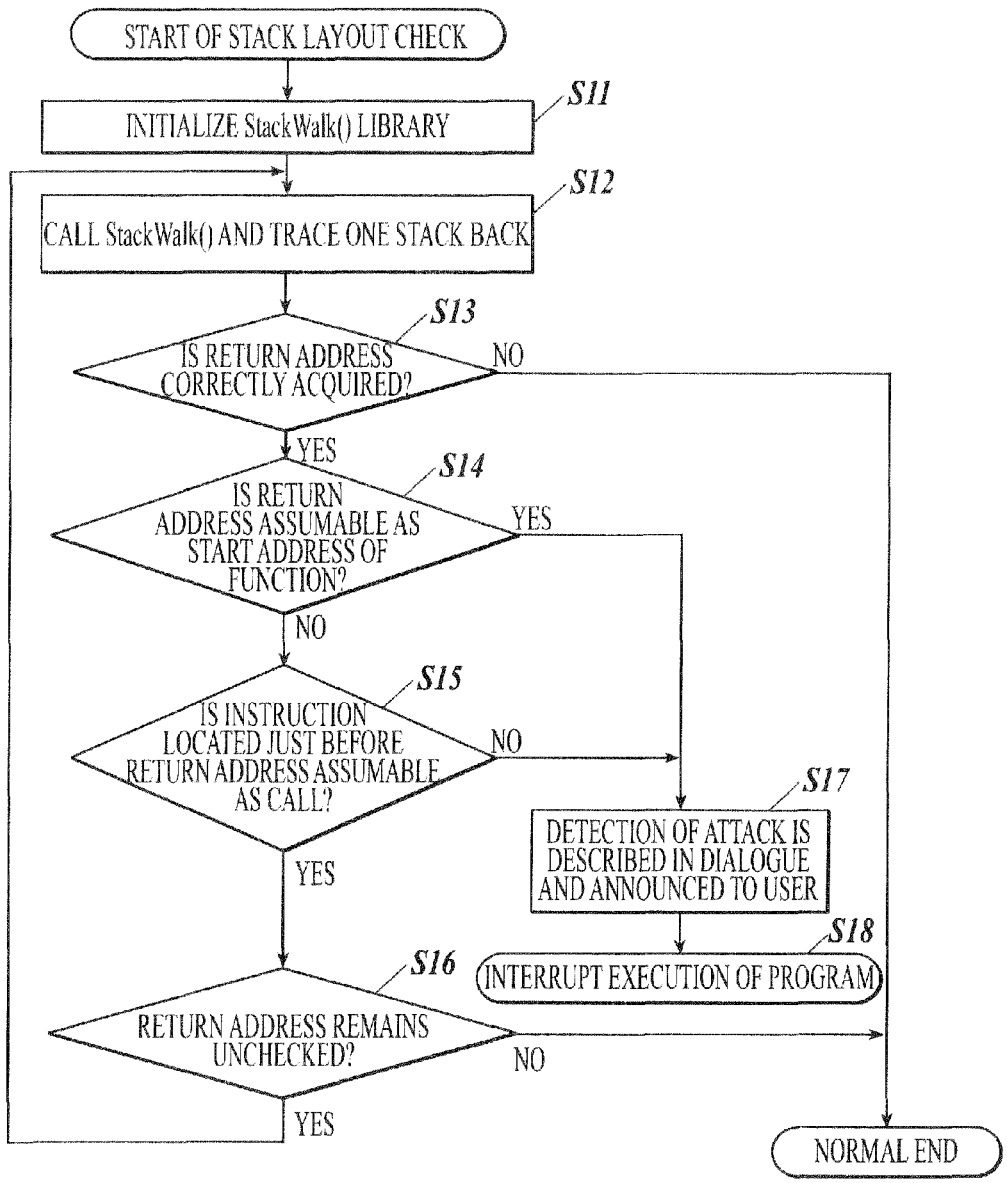

FIG.5

```
nop
nop          DESTINATION POINTED BY RETURN ADDRESS
nop
push ebp     POSITION OF STARTING ADDRESS OF FUNCTION
```
} C1

FIG.6

```
...
jmp eax      DESTINATION POINTED BY RETURN ADDRESS
...          HERE, ADJUST SO THAT STARTING ADDRESS OF
             TARGET FUNCTION FALLS INTO eax RESISTOR
```
} C2
```
...
push ebp        STARTING ADDRESS OF FUNCTION DESIRED
mov ebp, esp    TO BE EXECUTED
...
```

FIG. 7

| |
|---|
| ARGUMENT OF ExitProcess |
| Return Address |
| ARGUMENT 2 OF WinExec |
| ARGUMENT 1 OF WinExec |
| STARTING ADDRESS OF ExitProcess |
| ebp backup 3 |
| ARGUMENT 4 OF WriteFile |
| ARGUMENT 3 OF WriteFile |
| ARGUMENT 2 OF WriteFile |
| ARGUMENT 1 OF WriteFile |
| STARTING ADDRESS OF WinExec |
| ebp backup 2 |
| ARGUMENT 7 OF CreateFile |
| ARGUMENT 6 OF CreateFile |
| ARGUMENT 5 OF CreateFile |
| ARGUMENT 4 OF CreateFile |
| ARGUMENT 3 OF CreateFile |
| ARGUMENT 2 OF CreateFile |
| ARGUMENT 1 OF CreateFile |
| STARTING ADDRESS OF WriteFile |
| ebp backup 1 |

FIG. 8

| |
|---|
| ARGUMENT OF ExitProcess |
| Return Address |
| ARGUMENT 2 OF WinExec |
| ARGUMENT 1 OF WinExec |
| STARTING ADDRESS OF ExitProcess |
| ebp backup 2 |
| ARGUMENT 5 OF URLDownloadToFile |
| ARGUMENT 4 OF URLDownloadToFile |
| ARGUMENT 3 OF URLDownloadToFile |
| ARGUMENT 2 OF URLDownloadToFile |
| ARGUMENT 1 OF URLDownloadToFile |
| STARTING ADDRESS OF WinExec |
| ebp backup 1 |
| |

FIG. 11
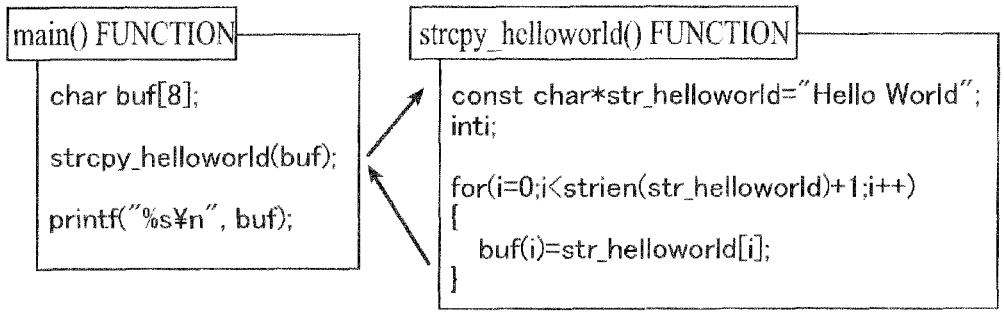
FIG. 12
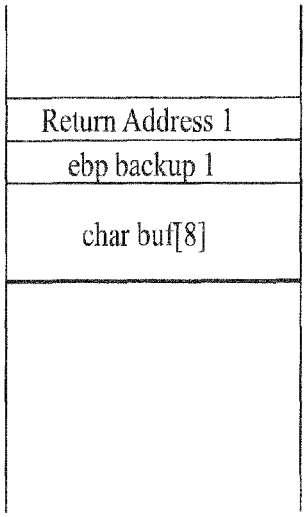
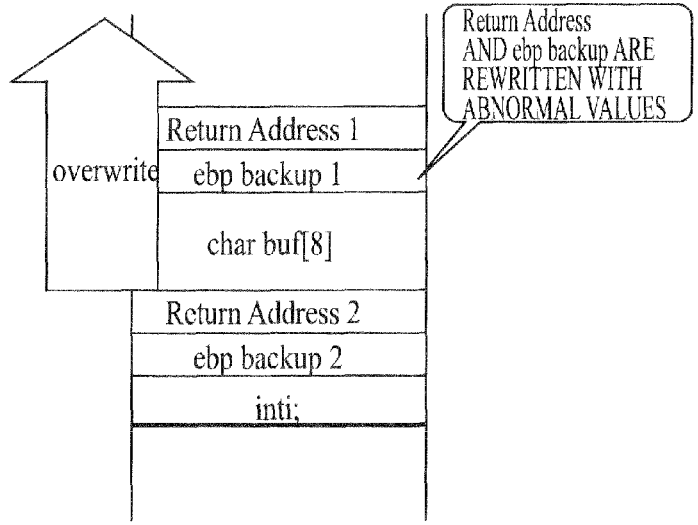

FIG.13
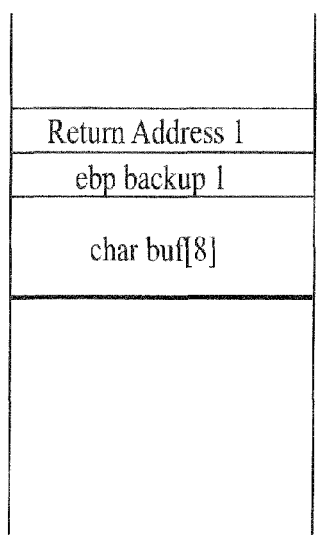
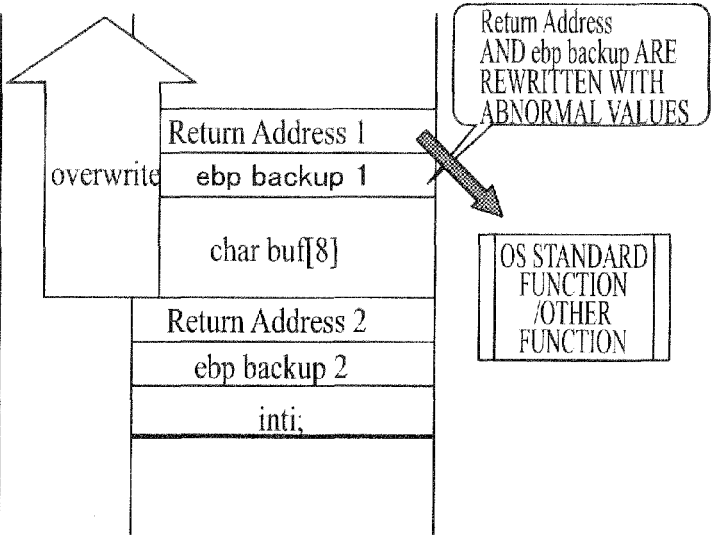

INFORMATION DEVICE, PROGRAM, METHOD, AND COMPUTER READABLE RECORDING MEDIUM FOR PREVENTING EXECUTION OF MALICIOUS PROGRAM CODE

CROSS-REFERENCE TO RELATED APPLICATION

This application is a U.S. National Phase Application under 35 USC 371 of International Application PCT/JP2010/056500 filed Apr. 12, 2010.

TECHNICAL FIELD

The present invention relates to an information device in which execution of malicious program code is preventable, a program for preventing execution of malicious program code, a method for preventing execution of a malicious program code and a computer readable recording medium which stores a program for preventing execution of malicious program code.

BACKGROUND ART

Generally, on information devices such as PC (Personal Computer) and WS (Work Station) there exists a control unit such as CPU (Central Processing Unit) which executes various types of data processing by sequentially executing program codes loaded in a working area of a storage unit such as a RAM (Random Access Memory). In recent years, illegal accesses to the information devices has been occurring by way of unauthorized execution using program codes created by malicious users.

Data managed by the information devices are generally assigned with access rights. Accordingly, the illegal accesses will not occur as long as the user has no access right. The illegal accesses will be possible if an unauthorized operation is made using a general program code assigned with the access rights to data. One known technique of this sort is using the so-called buffer overflow, allowing data at the time of execution of the program codes overflow out from a predetermined area allocated in the RAM or anything similar to RAM.

The illegal access using the buffer overflow will now be described in detail by showing comparison between the case where the program codes are properly ran and the case where the program codes are ran with an illegal action.

First, a model case where the program codes are properly ran will be explained referring to FIG. 9 and FIG. 10.

FIG. 9 is an illustration of an example source code of a program code. The source code in FIG. 9 starts with main( ) function, wherein strcpy_helloworld( ) function is called in main( ) function. In the source code, a character string "Hello!" is prepared in strcpy_helloworld( ) function, and is displayed on a monitor, computer screen and the like with the aid of printf( ) function in main( ) function. Note that the function herein means a subroutine or a subprogram having predetermined functionalities gathered into a module, and can be called in the main program as required.

The information about running the program code illustrated in FIG. 9 is stored in a call stack area allocated in the RAM. In the call stack area, the data are stored according to a LIFO (Last In First Out) or FILO (First In Last Out) structure.

FIG. 10 is an illustration example of an outline of the call stack area when the program code is running. As illustrated in FIG. 10, information about running the program code is stored downward into sequentially allocated areas.

For example, in the program code based on the source code illustrated in FIG. 9, Return Address1, ebp backup 1, char buf[8] and so forth are stored as a single stack frame, when main( ) function is processed. Next, when strcpy_helloworld( ) function in main( ) function is called, ReturnAddress2, ebp backup2, int i and so forth are also stored as a single stack frame.

ReturnAddress (return address) indicates an address value to which the process is to return upon the completion of a program. Return address is also an address value to which the process is to return upon completion of the subprogram or a function being called. ReturnAddress is automatically stored in the stack area by the CPU immediately after the execution of the program or immediately after the subprogram, i.e. function, is called.

Ebp is one type of CPU register, and indicates an address which is located just before the address of a temporary memory area currently being used. In the example illustrated in FIG. 10, ebp indicates addresses before char buf[8] and int i, and ReturnAddresses in the stack frame correspond to ebp. Accordingly, in the stack frame, by backing up the register value as ebp backup, an area in the stack frame can be easily used as a memory area for storing temporary data (variables and arrays).

In char buf[8], buf which is an array used in main( ) function is stored. The above-mentioned buf is an array which can store eight char-type (1 byte) variables, and 8-byte data can be stored in the above-mentioned buf. Int i is an int-type variable used in strcpy_helloworld( ) function.

Accordingly, by executing the above-mentioned program code, a stack frame for main( ) function is allocated in the stack area and a stack frame for strcpy_helloworld( ) function is allocated in the stack area. Then, the value of int i is sequentially incremented and the 6-byte character string "Hello!" is to be stored in char buf[8]. Next, upon completion of strcpy_helloworld( ) function, ReturnAddress2 is read out to return to main( ) function, and upon completion of main( ) function, ReturnAddress1 is read out and the program is terminated normally.

Next, a case where an illegal act took place when the program code is executed will be described with reference to FIG. 11 and FIG. 12.

FIG. 11 is a schematic diagram illustrating an example of source code of the program code. The program code illustrated in FIG. 11 is different from the program code illustrated in FIG. 9, in that a 12-byte data (11 characters+character string null terminator) "Hello World" is written in the array buf.

FIG. 12 is a schematic diagram illustrating an outline of the stack area when the program codes are executed. As illustrated in FIG. 12, in the stack area, an 8-byte area is allocated as an area for storing the buf array. Accordingly, when strcpy_helloworld( ) function is executed, data having a size larger than the allocated size to be is written. In such way, buffer overflow occurs when data having a size larger than the allocated size of memory is to be written in the memory. Note that the buffer overflow which occurs in the stack area is referred to as the stack-based buffer overflow.

In the stack area illustrated in FIG. 12, the allocation of areas is sequentially carried out downward, from the top to the bottom, and the writing of data into the allocated areas is carried out upward, from the bottom to the top. Accordingly, ReturnAddress1 and ebp backup are illegally overwritten with the 12-byte data "Hello World", if strcpy_helloworld( ) function is executed. When the content of ReturnAddress1 is rewritten with an address where an executable program code is located by the above mentioned overwriting process, ReturnAddress1 is read out upon completion of main( ) function and the program code is executed.

According to the source code illustrated in FIG. 11, the overflow is caused by the character string named "Hello World" which is defined in advance. However, in practice, there is a case where data received through a network port of a mail server or Web server, or data entered through a console or files, is stored into the buf array. In such case, an arbitrary program code may be executed by a malicious user through network, entry through a console, or entry through files, and thereby illegal access such as data theft and falsification may occur.

As a method of detecting such illegal access, one possible method is by detecting whether any illegal access is executed or not by inspecting the return addresses stored in the stack area and comparing the arrangement pattern of the return addresses under execution of the normal program and the arrangement pattern of the return addresses under operation of an attack code. For example, the program may be judged as normal, if a destination memory attribute pointed by the return address has a program code attribute, or if the memory areas have a non-writable attribute.

However, return-to-libc attack (see Non-Patent Document 1) may not be detected by the above-described method of detecting illegal access. The return-to-libc attack refers to a technique of making an illegal access by calling a function preliminarily stored in a computer without adding any malicious code into the program code.

FIG. 13 is a schematic diagram illustrating an example of an outline of the stack area under the return-to-libc attack, when executing the program codes illustrated in FIG. 11. As illustrated in FIG. 13, in the return-to-libc attack, the value pointed by the above-described return address, that is, the content of ReturnAddress1, is set to the top address of the normal function such as OS (Operating System) standard functions. If the return addresses in the stack area indicate memory areas for the program code, or if the memory areas have a non-writable attribute, the program including the return-to-libc attack may not be distinguishable from the normal program.

A possible attack could be an attack using the return-to-libc attack in which a predetermined program code is executed by combining program codes of programs which are stored in a storage unit of an information device in advance. Also in this method of attack, the return addresses in the stack area seem to have similar pattern as those in the return-to-libc attack, so that the program including the attack using the return-to-libc attack may not be distinguishable from the normal program.

Patent Document 1 discloses a technique using branch trace which is one of the CPU functions so as to detect an action of returning back to the top address of the OS standard function, when returning from the function which is being executed to the process of the function at a caller.

PRIOR ART DOCUMENT

Patent Document

[Patent Document 1] U.S. patent application Ser. No. 10/763,867, published as United States Patent Application Publication No. 2005/0166001

Non-Patent Document

[Non-Patent Document 1] "Return-to-libc attack", [online], presented by Wikimedia Foundation [retrived on Mar. 23, 2009] through the Internet, (URL: http://en.wikipedia.org/wiki/Return-to-libc_attack)

DISCLOSURE OF THE INVENTION

Problem to be Solved by the Invention

However, while the technique described in Patent Document 1 might successfully detect the return-to-libc attack making use of the function called branch trace, the technique may increase process load of the CPU since it uses the function owned by the CPU, and may also restrict the use of other applications (such as performance measurement tool and so forth) which make use of the branch trace function. In other words, the technique may increase the process load of the computer in a period over which the process for detecting the return-to-libc attack continues, and may thereby degrade the usability of the computer.

The present invention was conceived after considering the above-described problems in the prior art, and an object of which is therefore to provide a technique of preventing an illegal access using buffer overflow in a reliable and simple manner, without depending on the OS functions owned by CPU.

Means for Solving the Problem

In order to solve the above problems, according to one aspect of the present invention, an information device which performs data processing by executing program codes loaded in a memory with a central control unit includes a detection unit which detects a timing when any one of the program codes is called, a return address acquisition unit which sequentially acquires return addresses of the program codes loaded in the memory at the timing detected by the detection unit and a termination unit which searches for an illegal access based on destination addresses respectively pointed by the return addresses that are sequentially acquired by the return address acquisition unit at the timing detected by the detection unit, and which terminates the data processing when the illegal access is detected.

Preferably, the memory has a stack area used for storing the return addresses of the program codes, and the return address acquisition unit traces and acquires the return addresses stored in the stack area.

Preferably, the termination unit detects the illegal access when any of the destination addresses respectively pointed by the return addresses that are acquired by the return address acquisition unit is a starting address of a function, and terminates the data processing when the illegal access is detected.

Preferably, the termination unit detects the illegal access when an instruction located just before any of the destination addresses respectively pointed by the return addresses that are acquired by the return address acquisition unit is not a call instruction, and terminates the data processing when the illegal access is detected.

According to another aspect of the present invention, a computer, which executes program codes loaded in a memory, functions as a detection unit which detects a timing when any one of the program codes is called, a return address acquisition unit which sequentially acquires return addresses of the program codes loaded in the memory at the timing detected by the detection unit and a termination unit which searches for an illegal access based on destination addresses respectively pointed by the return addresses that are sequentially acquired by the return address acquisition unit at the timing detected by the detection unit, and which terminates the data processing when the illegal access is detected.

According to another aspect of the present invention, a method for preventing execution of a malicious program code in a computer which executes program codes loaded in a memory includes detecting a timing when any one of the program codes is called, sequentially acquiring return addresses of the program codes loaded in the memory at the detected timing, detecting an illegal access based on destination addresses respectively pointed by the acquired return addresses and terminating data processing when the illegal access is detected.

According to another aspect of the present invention, a computer-readable recording medium stores a program configured to make a computer, which executes program codes loaded in a memory, function as detection unit which detects a timing when any one of the program codes is called, a return address acquisition unit which sequentially acquires return addresses of the program codes loaded in the memory at the timing detected by the detection unit and a termination unit which searches for an illegal access based on destination addresses respectively pointed by the return addresses that are sequentially acquired by the return address acquisition unit at the timing detected by the detection unit, and which terminates the data processing when the illegal access is detected.

Advantageous Effect of the Invention

According to the present invention, an illegal access using buffer overflow can be prevented in a reliable and simple manner, without depending on the CPU functions.

BRIEF DESCRIPTION OF THE DRAWINGS

FIG. 1 This is a block diagram schematically illustrating a functional configuration of an information device according to an embodiment of the present invention.

FIG. 2A This is a diagram illustrating an example of a stack area allocated in a predetermined area in a RAM (30) under the return-to-libc attack.

FIG. 2B This is a diagram illustrating an example of a stack area allocated in a predetermined area in a RAM (30) under an attack based on an applied technique of the return-to-libc attack.

FIG. 3 This is a flow chart illustrating a hook process of the information device.

FIG. 4 This is a flow chart illustrating an example of a stack layout check process executed by an information device.

FIG. 5 This is a schematic diagram illustrating an example of an assembly code in a case where the return address is located near the starting address of a function.

FIG. 6 This is a schematic diagram illustrating an example of an assembly code in a case where the return address is set to an address of a program code totally different from the starting address of a function and the program is executed.

FIG. 7 This is a diagram illustrating contents of a stack when CreateFile is called under the return-to-libc attack.

FIG. 8 This is a diagram illustrating contents of a stack when URLDownloadTofile is called under the return-to-libc attack.

FIG. 11 This is a schematic diagram illustrating an example of a source code of the program code.

FIG. 12 This is a schematic diagram illustrating an example of an outline of the stack area when the program code is running.

FIG. 13 This is a schematic diagram illustrating an example of an outline of the stack area when the program code is running under the return-to-libc attack.

EMBODIMENTS FOR CARRYING OUT THE INVENTION

Figure 9:
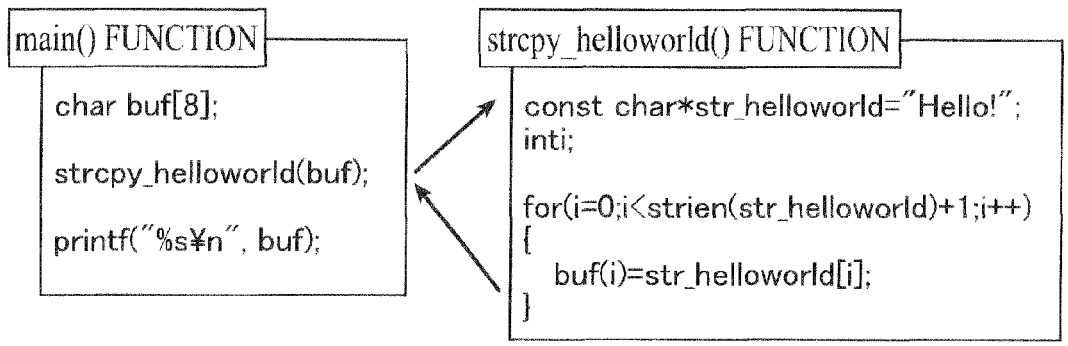
FIG. 9 This is a schematic diagram illustrating an example of a source code of the program code.
Figure 10:
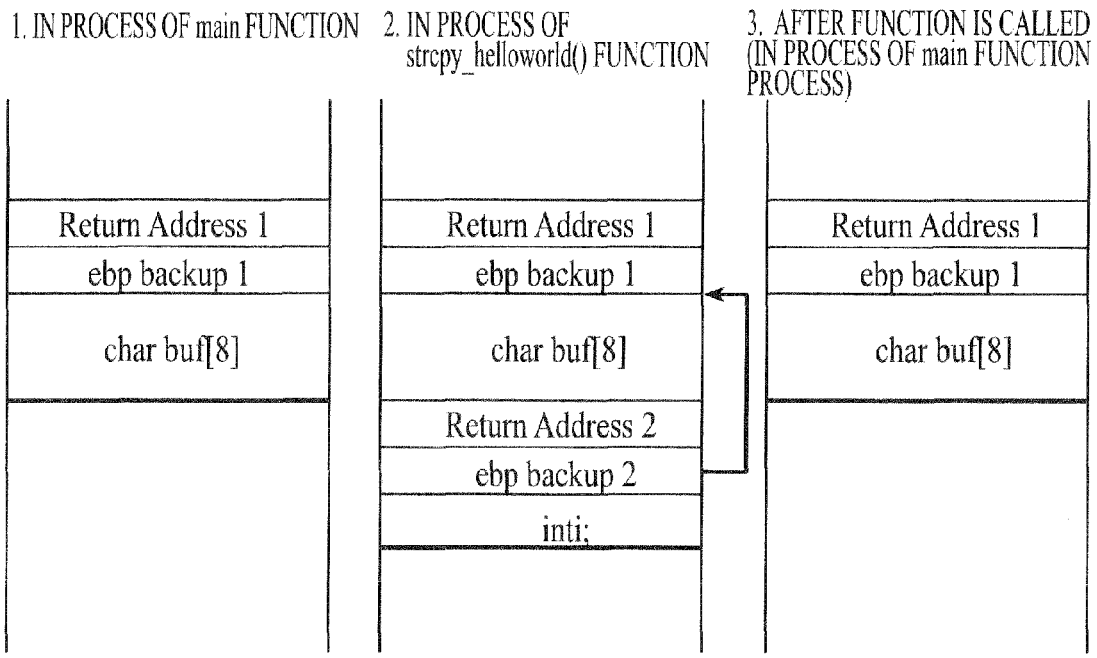
FIG. 10 This is a schematic diagram illustrating an example of an outline of the stack area when the program code is running.

Hereinafter, embodiments of the present invention will be described referring to the attached diagrams. However, the scope of the present invention is not limited to the embodiments.

First, a configuration of the information device according to an embodiment will be explained.

FIG. 1 schematically illustrates a functional configuration of an information device 1. As illustrated in FIG. 1, the information device 1 has a CPU (10), a storage unit (20), a RAM (30), an operation unit (40), a display unit (50), and an I/F unit (60). The individual units of the information device 1 are electrically connected through a bus (70). More specifically, the information device 1 is a PC, WS, PDA (Personal Digital Assistant), mobile phone, and the like.

The CPU (10) controls operations of the information device 1 in a centralized manner. The CPU (10) loads program codes and various data, which are stored in the storage unit (20) in a work area of the RAM (30), and outputs control signals to the individual units in cooperation with the data loaded in the RAM (30).

In the storage unit (20), data which includes program codes and various setting information is stored. The data is stored in the storage unit (20) so as to be readable and writable by the CPU (10). The storage unit (20) is a HDD (Hard Disk Drive), semiconductor memory, and the like, for example. The storage unit (20) may alternatively be configured to store the data in a ROM (Read Only Memory). The program codes stored by the storage unit (20) includes basic software such as OS (Operating System), various application programs provided by vendors, and programs relevant to the processing described later.

In the RAM (30), a stack area for storing information about running the program code is allocated.

FIG. 2A illustrates an example of a stack frame in the stack area in the RAM (30) when the return-to-libc attack is being executed. As illustrated in FIG. 2A, data such as ExitProcess parameter, ReturnAddress, WinExec parameters 1 and 2, a starting address of ExitProcess, and ebp backup are stored in the stack area. There are cases in the return-to-libc attack where the starting address of ExitProcess( ) is set as the return address after WinExec( ) is executed. The example illustrated in FIG. 2A shows a stack area when the return-to-libc attack is carried out and when WinExec( ) is being executed.

ExitProcess( ) is a function for terminating the program, and a termination code of the program to be terminated is set to the argument of ExitProcess. WinExec( ) is a function for allowing execution of a designated program. Since ReturnAddress is located just before ebp backup, ReturnAddress can sequentially be traced and acquired by following ebp backup.

The stack frames included in the stack area are sequentially allocated as the program codes being executed, when the individual program codes are sequentially executed. For a model case where the main program code is executed and another program code which is relevant to a subroutine is called within the main program code and further, another program code is called, the area corresponding to each of the above program codes is allocated according to the order of the stack frames. When the process according to each program code is terminated, returning to the main program code or a process to be performed after termination of the program will be carried out by the ReturnAddress in the stack frame being read out.

FIG. 2B illustrates an example of a stack frame in a stack area allocated in a predetermined area of the RAM (30) in the above described application technique where the return-to-libc attack is applied. In the area of the "existing program code", a code for calling ExitProcess in the existing program code is stored.

The operation unit (40) accepts an entry of operation made by a user and outputs an operation signal according to the operation to the CPU (10). The operation unit (40) herein is a keyboard having character keys, numeral keys and other keys assigned to various functions, or a pointing device such as mouse, for example.

The display unit (50) displays an image on a screen, the image being based on a display control signal output from the CPU (10). The display unit (50) may be a CRT (Cathode Ray Tube), LCD (Liquid Crystal Display), and the like.

The I/F unit (60) has a data network IC (Integrated Circuit), connectors and so forth (all of them not illustrated), and is connected to external devices and a communication network so as to communicate with each other. The I/F unit (60) may typically be a USB (Universal Serial Bus) network port of a computer, for example, or a network interface card (NIC) which allows connection with LAN (Local Area Network), WAN (Wide Area Network) or the Internet, for example.

Next, operations of the information device (1) when detecting execution of malicious program code will be explained. In order to prevent execution of malicious program code in the information device (1), it is necessary to insert a process for checking a malicious program code execution by detecting an API, library function, system call and so forth which are required for the execution of the malicious program code. In the information device (1) of this embodiment, detection of malicious code used for calling a predetermined library function and insertion of a process for checking illegality are realized by using hooks.

The hook process is a mechanism for enabling a user to insert his or her unique process at a specific position in any given program. In other words, it is a mechanism used when the programmer who created the program code to be hooked and the programmer who created the program code that performs the hook process are different persons, and where the source codes relevant to their program codes are not created by the same programmer. Accordingly, the mechanism is used for modifying the functions or API (Application Programming Interface) of the OS or functions or APIs provided by the vendor, or for adding arbitrary processes.

The hook process may be used also when the programmer himself or herself is able to modify the subprograms such as functions which are a target for checking. Note that, for the case where the programmer himself or herself is able to modify the subprograms and he or she actually modified the subprograms so as to be checked for illegality upon execution of the subprograms, it is no longer necessary to use the hook process and the existing functions and library can be used as safe functions and library.

First, a model case for checking whether a malicious program code is executed or not by performing API hook process (performing hook process on library function) will be explained with reference to FIG. 3.

Hereinafter, a hook process (FIG. 3) to be performed on a library function named WinExec( ) provided by a vendor, and a stack layout check process (FIG. 4) to be executed upon the library function being called will be shown as examples. Note that the following examples are similarly applied to the hook process performed on other library functions (ExitProcess( ) for example).

FIG. 3 is a flow chart illustrating the hook process executed in the information device (1). The hook process is executed in cooperation with the CPU (10) and the program stored in the storage unit (20).

As illustrated in FIG. 3, first the starting address of a function of WinExec( ) is acquired (step S1). The acquisition of address of the function is enabled by calling the function provided from a vendor.

Next, a small function (temporary function) for hooking execution of API is dynamically generated (step S2). The dynamically-generated function is a function for calling the stack layout check process described later.

Next, the top code of WinExec( ) is rewritten and modified so as to enable execution of the function generated in step S2 (step S3).

By virtue of the hook process described above, it is now capable of inserting a process of detecting a call of the sub-program code, and checking any illegality, in the information device (1). In general cases where a subprogram of the function is called, a function called by a certain function is executed as it is. In contrast, in the information device (1), by performing the above-described hook process which takes place before the subprogram code is called, the stack layout check process may be executed upon calling of the subprogram code.

FIG. 4 illustrates a flow chart of the stack layout check process executed in the information device (1). The stack layout check process is called from the function dynamically generated by the hook process, by the CPU (10) and the program stored in the storage unit (20) cooperating with each other. In the stack layout check process, while a stack trace is carried out using the StackWalk( ) function, the stack trace may alternatively be carried out without using StackWalk( ).

As illustrated in FIG. 4, a StackWalk( ) library is initialized (step S11). The StackWalk( ) library is a function provided by a vendor which enables the stack trace. By incrementing or decrementing a position to be traced by using StackWalk( ) it is now possible to sequentially acquire the return addresses stored in the stack area.

Next, StackWalk( ) is called to trace one stack back so as to sequentially call the stack frames in the stack area (step S12), and whether the return address was correctly acquired or not after the tracing is determined (step S13).

If it is determined in step S13 that the return address is not correctly acquired (step S13; NO), it is assumed that the termination is normal and the execution of WinExec( ) which is the target for checking is continued. A possible case which corresponds to this situation is such that the stack has been damaged by an unknown reason other than illegal access, and thereby StackWalk( ) does not properly operate. While the process in this embodiment is configured to terminate normally when the StackWalk( ) does not operate correctly, it is also possible to terminate the program or to output a dialog box on the display unit (50) by which the user can confirm whether to terminate or continue the program even when the stack trace failed.

On the other hand, when it was determined that the return address is correctly acquired (step S13; YES), the return address is judged whether it is the starting address of the function (step S14). The starting address of the function may be acquired by various known methods, for example, by referring to values preliminarily stored in the storage unit (20)

or by referring to an IAT (Import Address Table) which is an array for storing actual memory address of the function to be imported.

If the return address is not determined as the starting address (step S14; NO), whether the instruction located just before the return address is a CALL instruction or not is determined (step S15). The CALL instruction is an instruction for calling a subroutine, and in step S15, it is determined whether the instruction located just before the destination address pointed by the return address is the call instruction.

If the return address is determined as being the CALL instruction (step S15; YES), whether there is any unchecked return address or not is determined (step S16).

If it is determined that there remains unchecked addresses (step S16; YES), the process goes back to step S12, and the next return address is traced.

If it is determined that there are no addresses remained unchecked (step S16; NO), it is assumed that the termination is normal and the execution of WinExec( ) which is the target for checking is continued.

On the other hand, if the return address is determined as the starting address (step S14; YES), or if the instruction was not determined as being the CALL instruction (step S15; NO), an attack such as an illegal access is detected and a dialog stating that the data processing is temporarily terminated in order to prevent execution of any malicious program code is displayed on the display unit (50) (step S17), and execution of the program is terminated (step S18).

In the stack layout check process described above, the return-to-libc attack is detected in step S14 and step S15. When the return-to-libc attack takes place, there is a characteristic that the destination pointed by the return addresses falls on the starting address of the function. For the case of a normal program, the destination pointed by the return addresses does not fall on the starting address of the function, and the process thereafter continues for the rest of the function.

Further, in a Return-to-libc attack wherein the program code stored in the information device (1) is combined, which is an application technique of the return-to-libc attack, there is a characteristic that the instructions located just before the destinations pointed by the return addresses are not the CALL instructions. These two characteristics are not found when a normal program is executed. In the stack layout check process, the return-to-libc attack is detected based on these two characteristics.

Next, derivation patterns of the return-to-libc attack, detectable by the stack layout check process, will be explained. In the aforementioned stack layout check process, the return-to-libc attack becomes detectable by checking the destinations pointed by the return addresses, wherein the return-to-libc attack has various known attack patterns.

FIG. 5 illustrates an example of code C1 of the case where the return address is near the starting address of the function. Normally, an instruction which instructs to do nothing even when the instruction is executed by the CPU is located just before the starting address of the function provided by OS. In the return-to-libc attack, it may be possible that the return addresses designate a vicinity of the starting address intentionally and do not designate the starting address of the function. As illustrated in FIG. 5, a number of nop instructions are inserted before the position of the starting address of the function. The nop instructions are instructions which indicate that the CPU executes nothing.

In the case shown in FIG. 5, since the destination pointed by the return address does not fall on the starting address of the function, the return-to-libc attack cannot be detected in step S14, but may be detected in step S15, by checking whether the instruction located just before the destination pointed by the return address is the CALL instruction or not.

FIG. 6 illustrates an example of code C2 for the case where the return address is set to an address of a program code totally different from the starting address of the function and the program is allowed to run. In the illustrated example in FIG. 6, an instruction code "jmp eax" is stored at the destination pointed by the return address. The instruction "jmp eax" is an instruction for executing the instruction located at the address value stored in the eax register. In the eax register, the starting address of the function desired to be executed is stored. When the code at the destination pointed by the return address is executed in the state illustrated in FIG. 6, "jmp eax" is executed first, and then, the instruction at starting address of the function which is desired to be executed, is executed next.

In the case shown in FIG. 6, since the destination pointed by the return address is not the starting address of the function, the return-to-libc attack cannot be detected in step S14. However, the malicious attacker needs to find an instruction code "jmp eax" from other program code area, and set the return address to the address where "jmp eax" is. In the return-to-libc attack, the instruction just before the instruction code "jmp eax" is not the CALL instruction in most cases. Thus, the return-to-libc attack can be detected in step S15.

Next, a return-to-libc attack which is run in Windows Operating System (registered trademark, this annotation will be omitted hereinafter) will be described as an example, and the timing when the information device (1) of the present invention detects the return-to-libc attack will be described.

First, an exemplary return-to-libc attack caused by executing a file created by the CPU 10 will be explained. In this case, the return-to-libc attack takes place using CreateFile( ) WriteFile( ) WinExec( ) ExitProcess( ) and so forth, which are the functions provided by Windows. CreateFile( ) is a function for creating files, wherein name of the created file is used as an argument. WriteFile( ) is a function for writing data into the file, wherein a file handle which indicates a target where data is to be written, data to be written, data size and the like are used as arguments.

In the return-to-libc attack, first, a predetermined file is created using CreateFile( ) and WriteFile( ) The procedure herein is configured to execute the above created file using WinExec( ) and to terminate the above created file by using ExitProcess( ).

FIG. 7 illustrates an example of a stack area stored in the RAM (30), when CreateFile( ) is running under the return-to-libc attack. In the stack as illustrated in FIG. 7, the return addresses to be checked by the stack layout check process are the following three: "starting address of WriteFile", "starting address of WinExec" and "starting address of ExitProcess". Even in the case where the starting address points a position near the starting address as illustrated in FIG. 5 or where the starting address points another program code as illustrated in FIG. 6, the return-to-libc attack can be detected in step S15.

There may be another case where an attack code of the return-to-libc attack prompts downloading of a malicious code through the Internet, and the file is executed. For example, first, a malicious file is downloaded through the I/F unit (60) from the Internet, using a function named URLDownloadTofile( ) provided by Windows. The downloaded file is then executed using WinExec( ).

FIG. 8 illustrates an exemplary stack area stored in the RAM (30), when URLDownloadTofile( ) is running under the return-to-libc attack. In the state of stack illustrated in FIG. 8, the return addresses to be checked by the stack layout check process are the following two: "starting address of WinExec" and "starting address of ExitProcess". Even in the case where the starting address points a position near the starting address as illustrated in FIG. 5 or where the starting address points another program code as illustrated in FIG. 6, the return-to-libc attack may be detected in step S15.

As described above, according to the information device of the present invention, the return-to-libc attack, which is a technique of illegal access using buffer overflow, can be prevented in a reliable and simple manner, without depending on the CPU function.

Note that the description of the above-described embodiments is given merely for exemplary purposes, and is not intended to limit the invention to the embodiments. The configurations and operations in the above-described embodiments may be modified as needed.

For example, while the above description discloses the case where the storage unit (20) and the ROM are used as the computer-readable media for storing the program of the present invention, the media is not limited to these examples. As other computer-readable media, portable recording media including non-volatile memory such as flash memory, and CD-ROM can be applied. Further, as a medium for providing the program data of the present invention through network lines connected to the I/F unit (60), carrier wave can also be applied.

The entire contents of disclosure of Japanese Patent Application No. 2009-107294, filed on Apr. 27, 2009, including specifications, claims, diagrams and abstracts, are incorporated hereinto as part of the present application.

INDUSTRIAL APPLICABILITY

The present invention is applicable in the fields of information devices including PC, WS, mobile phone, and network appliances.

The invention claimed is:

1. An information device which performs data processing by executing program codes loaded in a memory of the information device, the information device comprising:
 a display; and
 a controller comprising a CPU which executes a program stored in the memory of the information device so as to operate as:
  a detection unit which detects a timing when any one of the program codes is called;
  a return address acquisition unit which sequentially acquires return addresses of the program codes loaded in the memory at the timing detected by the detection unit, wherein the return addresses respectively point to destination addresses to which the respective program codes return to upon completion of the respective program codes; and
  a termination unit which searches for an illegal access based on the destination addresses that are sequentially acquired by the return address acquisition unit at the timing detected by the detection unit, and which terminates the data processing when the illegal access is detected;
 wherein the termination unit determines whether or not any of the destination addresses acquired by the return address acquisition unit is a starting address of a function, and when the termination unit determines that any of the destination addresses acquired by the return address acquisition unit is the starting address of the function, the termination unit detects the illegal access and terminates the data processing;
 wherein when the termination unit determines that any of the destination addresses acquired by the return address acquisition unit is not the starting address of the function, the termination unit determines whether or not an address located just before any of the destination addresses acquired by the return address acquisition unit stores a call instruction, and when the termination unit determines that the address located just before any of the destination addresses acquired by the return address acquisition unit does not store the call instruction, the termination unit detects the illegal access and terminates the data processing; and
 wherein when the termination unit detects the illegal access, the controller displays on the display a dialog stating that the data processing is temporarily terminated.

2. The information device as claimed in claim 1, wherein the memory has a stack area used for storing the destination addresses of the program codes, and
 the return address acquisition unit traces and acquires the destination addresses stored in the stack area.

3. A method for preventing execution of a malicious program code in a computer which executes program codes loaded in a memory of the computer, the method comprising:
 detecting a timing when any one of the program codes is called;
 sequentially acquiring return addresses of the program codes loaded in the memory at the detected timing, wherein the return addresses respectively point to destination addresses to which the respective program codes return to upon completion of the respective program codes;
 detecting an illegal access based on the acquired destination addresses; and
 when the illegal access is detected, terminating data processing and displaying on a display a dialog stating that the data processing is temporarily terminated;
 wherein the illegal access is detected by determining whether or not any of the acquired destination addresses is a starting address of a function, and wherein when it is determined that any of the acquired destination addresses is the starting address of the function, the illegal access is detected and the data processing is terminated;
 wherein when it is determined that any of the acquired destination addresses is not the starting address of the function, the illegal access is detected by determining whether or not an address located just before any of the acquired destination addresses stores a call instruction, and wherein when it is determined that the address located just before any of the acquired destination addresses does not store the call instruction, the illegal access is detected and the data processing is terminated; and
 wherein the detecting of the timing, the sequentially acquiring, the detecting of the illegal access, and the terminating are performed by executing a program stored in the memory of the computer.

4. A non-transitory computer-readable recording medium which stores a program configured to make a computer, which executes program codes loaded in a memory, function as:
 a detection unit which detects a timing when any one of the program codes is called;
 a return address acquisition unit which sequentially acquires return addresses of the program codes loaded in the memory at the timing detected by the detection unit, wherein the return addresses respectively point to destination addresses to which the respective program codes return to upon completion of the respective program codes; and a termination unit which searches for an illegal access based on the destination addresses that are sequentially acquired by the return address acquisition unit at the timing detected by the detection unit, and which terminates the data processing when the illegal access is detected;

wherein the termination unit determines whether or not any of the destination addresses acquired by the return address acquisition unit is a starting address of a function, and when the termination unit determines that any of the destination addresses acquired by the return address acquisition unit is the starting address of the function, the termination unit detects the illegal access and terminates the data processing;

wherein when the termination unit determines that any of the destination addresses acquired by the return address acquisition unit is not the starting address of the function, the termination unit determines whether or not an address located just before any of the destination addresses acquired by the return address acquisition unit stores a call instruction, and when the termination unit determines that the address located just before any of the destination addresses acquired by the return address acquisition unit does not store the call instruction, the termination unit detects the illegal access and terminates the data processing; and wherein when the illegal access is detected, a dialog stating that the data processing is temporarily terminated is displayed on a display.

* * * * *